US011856204B2

(12) United States Patent  
Wang et al.

(10) Patent No.: US 11,856,204 B2  
(45) Date of Patent: Dec. 26, 2023

(54) MACROBLOCKING ARTIFACT DETECTION

(71) Applicant: SSIMWAVE INC., Waterloo (CA)

(72) Inventors: Zhou Wang, Waterloo (CA); Kai Zeng, Kitchener (CA)

(73) Assignee: SSIMWAVE INC., Waterloo (CA)

( * ) Notice: Subject to any disclaimer, the term of this patent is extended or adjusted under 35 U.S.C. 154(b) by 163 days.

(21) Appl. No.: 17/237,722

(22) Filed: Apr. 22, 2021

(65) Prior Publication Data

US 2021/0344930 A1     Nov. 4, 2021

Related U.S. Application Data

(60) Provisional application No. 63/019,547, filed on May 4, 2020.

(51) Int. Cl.
| | |
|---|---|
| *H04N 19/14* | (2014.01) |
| *H04N 19/172* | (2014.01) |
| *H04N 19/176* | (2014.01) |
| *H04N 19/30* | (2014.01) |

(52) U.S. Cl.
CPC ........... *H04N 19/14* (2014.11); *H04N 19/172* (2014.11); *H04N 19/176* (2014.11); *H04N 19/30* (2014.11)

(58) Field of Classification Search
CPC .... H04N 19/14; H04N 19/172; H04N 19/176; H04N 19/30
See application file for complete search history.

(56) References Cited

U.S. PATENT DOCUMENTS

| | | | | |
|---|---|---|---|---|
| 5,974,158 | A | * | 10/1999 | Auty .................... G01S 3/7865 382/103 |
| 5,978,519 | A | * | 11/1999 | Bollman ................. G06T 7/70 382/270 |
| 6,865,291 | B1 | * | 3/2005 | Zador .................... H04N 19/63 382/253 |
| 8,077,774 | B1 | | 12/2011 | Dawson |
| 8,619,880 | B2 | * | 12/2013 | Teng .................... H04N 19/117 375/240 |
| 2007/0237241 | A1 | | 10/2007 | Ha et al. |
| 2007/0285729 | A1 | * | 12/2007 | Wada ................... H04N 19/117 375/E7.193 |
| 2009/0097575 | A1 | | 4/2009 | Teng et al. |
| 2012/0020415 | A1 | | 1/2012 | Yang et al. |
| 2014/0211845 | A1 | * | 7/2014 | Lei ....................... H04N 19/159 375/240.02 |
| 2015/0208090 | A1 | * | 7/2015 | Sakakibara ............ H04N 19/14 375/240.12 |
| 2015/0256857 | A1 | * | 9/2015 | Joshi .................... H04N 19/154 375/240.02 |
| 2019/0238890 | A1 | * | 8/2019 | Tsai ....................... H04N 19/86 |
| 2021/0158523 | A1 | * | 5/2021 | Khademi ................. G06T 5/40 |

\* cited by examiner

*Primary Examiner* — Jonathan R Messmore  
(74) *Attorney, Agent, or Firm* — Brooks Kushman P.C.

(57) ABSTRACT

Macroblocking artifacts are assessed in an encoded video. Edges are detected and edge strengths are computed at macroblock boundaries in each decoded frame of the video. The detected edges are paired at horizontal or vertical sides of each macroblock to identify macroblock edge pairs. A macroblocking level of the frame is identified according to the macroblock edge pairs. For instance, for each of the macroblock edge pairs, the edges of the pair are identified as being macroblocking edges if edge strengths of both sides of the pair exceed a significance threshold, and the macroblocking level of the frame is determined by aggregating the macroblocking edges in the frame.

27 Claims, 6 Drawing Sheets

MACROBLOCKING ARTIFACT DETECTION

CROSS-REFERENCE TO RELATED APPLICATIONS

This application claims the benefit of U.S. provisional application Ser. No. 63/019,547 filed May 4, 2020, the disclosure of which is hereby incorporated in its entirety by reference herein.

TECHNICAL FIELD

Aspects of the disclosure generally relate to detection of macroblocking artifacts in digital images and video signals.

BACKGROUND

Macroblocking is a frequently-observed video artifact where visually annoying false blockiness appear at the boundaries of macroblocks. Macroblocking is typically associated with block-based video coding technologies, which are widely adopted in the most commonly used video coding standards and open-source video encoding tools, including MPEG-1, MPEG-2, MPEG-4, H.261, H.263, H.264/AVC, H.265/HEVC, VPx, AVSx, Dirac, Sorenson, ProRes, Motion-JPEG, WMV, RealVideo, Theora, VC-x, AV1, FVC, and LCEVC, where video frames are often divided into units of blocks (squares or rectangular shapes) for the purposes of motion estimation, intra-frame prediction, inter-frame prediction, transformation, quantization and encoding. Such divisions often lead to discontinuities at horizontal or vertical block boundaries in terms of pixel intensity and color values, leading to the visual blockiness appearance. The discontinuities may be caused by different reasons, including imperfect motion estimation/compensation, quantization, and errors in video encoding, decoding, processing and transmission. Although the term macroblock refers to specific basic processing units (which could be further divided into transform units) in earlier video coding standards, and has been replaced in later coding standards and encoders by other terms such as coding tree unit in H.265/HEVC, the visual blockiness artifact is still referred to as macroblocking by convention even in later standards and encoders. Generally, the term macroblocking artifacts may refer to all such blockiness artifacts, regardless of the encoding standards and encoder types. Macroblocking that occurs in a video frame often extends to consecutive frames, which is often referred to as error propagation.

SUMMARY

In one or more illustrative examples, a method for assessing macroblocking artifacts in an encoded video includes detecting edges and computing edge strengths at macroblock boundaries in each decoded frame of the video; pairing the detected edges at horizontal or vertical sides of each macroblock to identify macroblock edge pairs; and identifying a macroblocking level of the frame according to the macroblock edge pairs.

In one or more illustrative examples, a system for assessing macroblocking artifacts in an encoded video includes a computing device programmed to detect edges and computing edge strengths at macroblock boundaries in each decoded frame of the video; pair the detected edges at horizontal or vertical sides of each macroblock to identify macroblock edge pairs; and identify a macroblocking level of the frame according to the macroblock edge pairs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
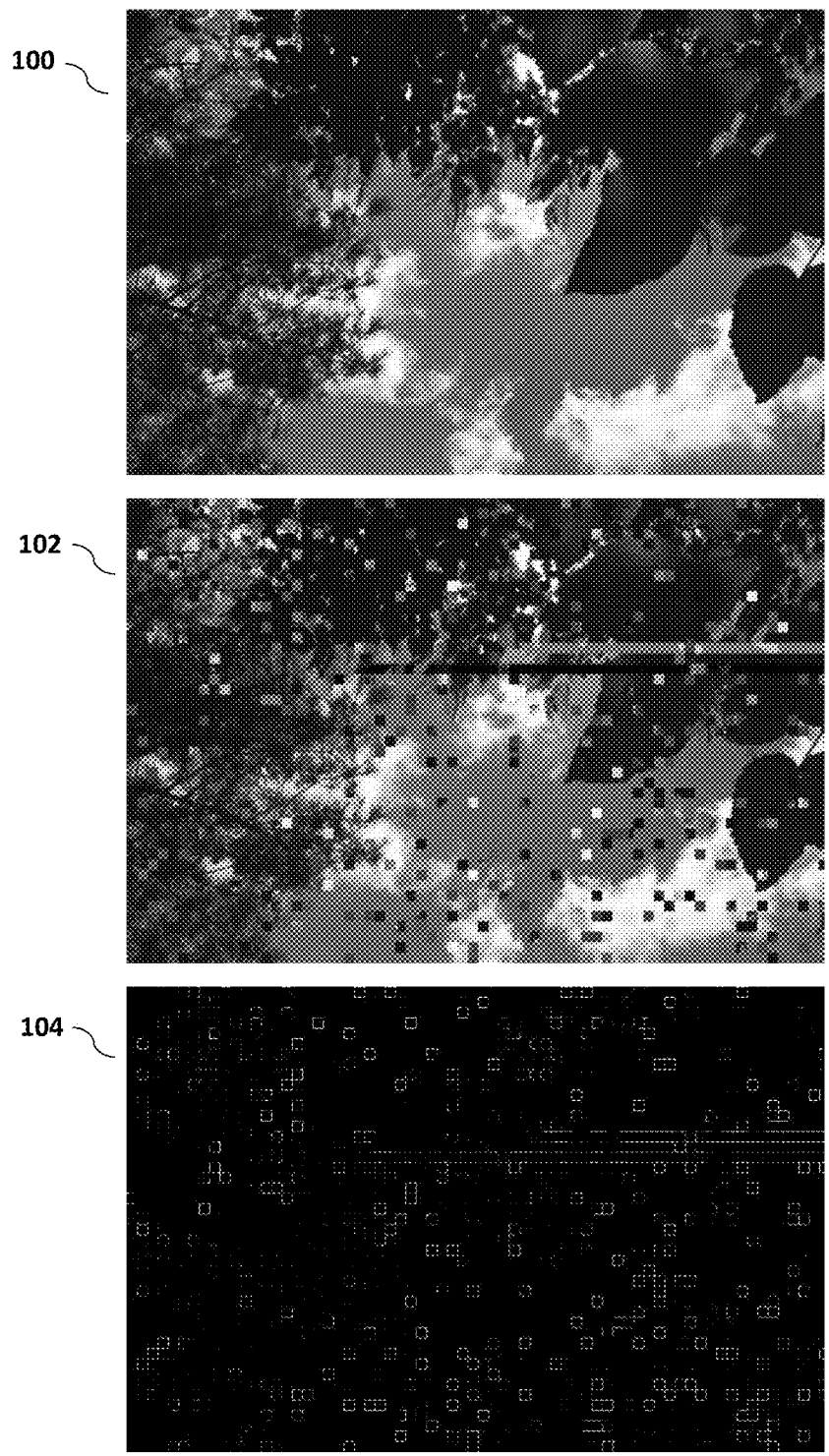
FIG. 1 illustrates a sample original frame, distorted frame with macroblocking artifacts caused by transmission or encoding/decoding error, and macroblocking map created by one embodiment of the present disclosure.

FIG. 1 illustrates a sample original frame 100, distorted frame 102 with macroblocking artifacts, and macroblocking map 104. These artifacts may be caused by transmission or encoding/decoding errors. A common cause of such macroblocking is due to errors in transmission (such as packet loss in network transmission) and the encoding/decoding processes. Common observations of such type of macroblocking include: 1) macroblocking is often clustered in space and time; 2) information inside a block is often completely missing and may be filled with irrelevant content; 3) the block size is often more regularized; 4) macroblocking is often associated with other severe artifacts than blockiness due to loss of motion information or motion-predictive error propagation. Another less common cause of macroblocking is low bit-rate lossy video compression (e.g., independent of transmission or encoding/decoding errors), where the causes of blockiness are often imperfect motion estimation/compensation and quantization.

As discussed in detail herein, macroblocking caused by errors in the transmission and encoding/decoding processes may be automatically detected from fully decoded video frames. This is as opposed to general video quality assessment or the detection of errors in the network transmission processes or errors in the encoding/decoding processes (e.g., inconsistency in video syntax). These other methods can only provide indirect and inaccurate predictions on the potential appearance of macroblocking, but typically offer poor estimations on the levels of the visual appearance of macroblocking and provide no estimation on the exact frames that contain macroblocking or the spatial locations of macroblocking in a video frame.

More specifically, the macroblocking map 104 may be created at each frame of a video, indicating the location and strength of macroblocking edges. FIG. 1 gives an example of the macroblocking map 104 created by one embodiment of the present disclosure. The macroblocking map may be used to detect the spatial location of macroblocking, and also to estimate the spread and strength levels of macroblocking at each frame. The present disclosure uses human visual system models (visual luminance masking, visual texture masking, and visual just noticeable difference (JND)) to estimate the visibility level of macroblocking. These macroblocking spread and strength measures may be combined to estimate an overall macroblocking level of each frame. This macroblocking estimation may be applied to different color channels of a frame and these estimations of all color channels may be combined to form an overall macroblocking estimation. Per-frame macroblocking estimations may be aggregated at larger time scales including per group-of-pictures, per-second, per-minute, per-hour, per-day, per-week, per-month, per-year, etc. The aggregation may be done by taking the average, median, or maximum of per-frame macroblocking estimations, or the percentage of frames being detected to have macroblocking. The detected aspects of the macroblocking edges may include horizontal and vertical edges at block boundaries, pairs block edges on two sides (either [left, right] sides, or [top, bottom] sizes) of a macroblock of given size, and macroblocking when the edge strength of both sizes is significant.

Figure 2:
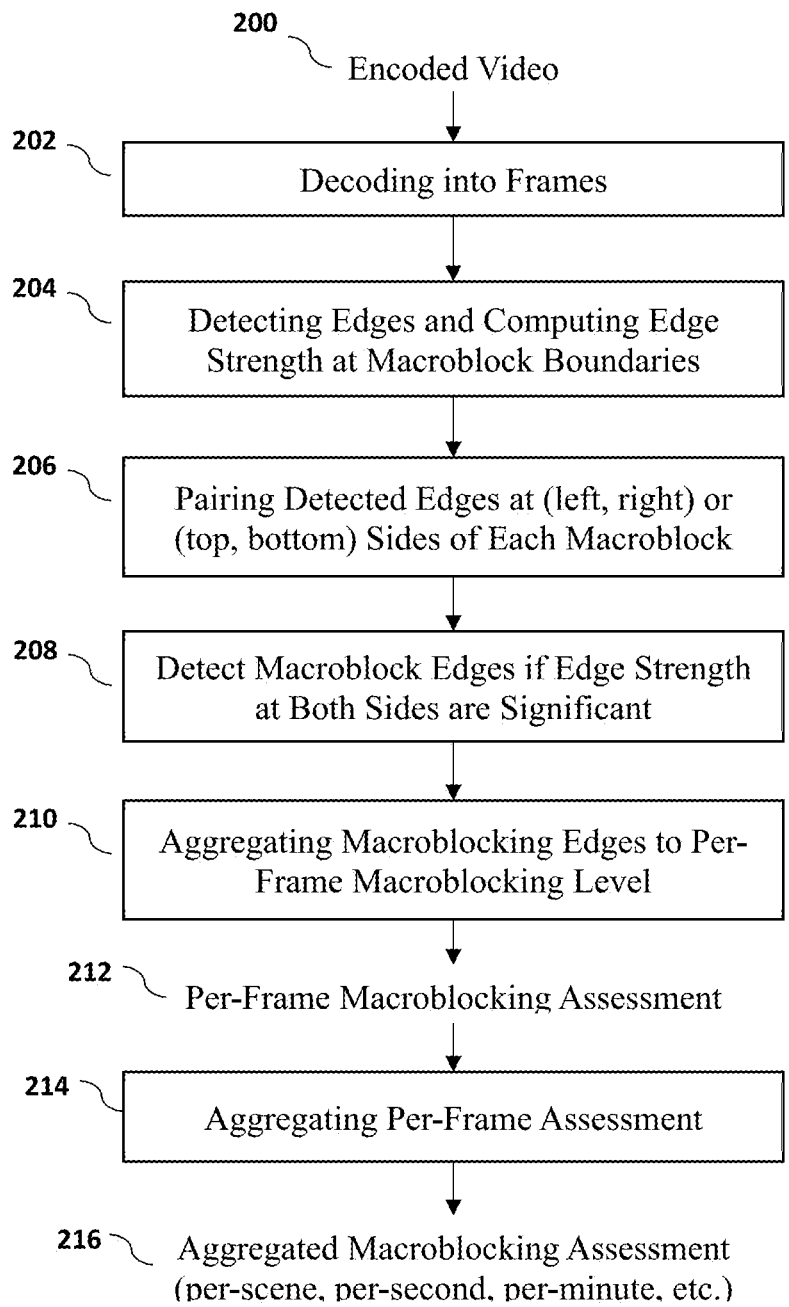
FIG. 2 illustrates an example process for the detection of macroblocking artifacts in digital images and video signals.

FIG. 2 illustrates an example process for the detection of macroblocking artifacts in digital images and video signals. In an example, the digital images may be still images. In another example, the digital images may be fully decoded video frames from a video signal. In an video signal example, for a given encoded video 200 under testing, the video 200 may be decoded into individual video frames at operation 202. Each frame may contain a matrix of pixel intensity values, or several matrices of pixel color values.

At operation 204, edge detection and edge strength measurement method are applied to all macroblock boundaries. An example approach to the performance of edge detection and edge strength measurement is described in detail with respect to FIG. 3. More generally, the specific locations of macroblock boundaries depends on the specific video encoders and their configurations. For example, in MPEG-2 coded videos, the macroblock size is typically 16×16. But in more recent video coding standards or encoders, the sizes of processing block unit often vary, for example, 4×4, 8×8, 16×16, 32×32, 64×64, 128×128 or even larger. Also, the block may have rectangular shapes too. All of such block boundaries are either horizontal or vertical. Herein, all such block boundaries are referred to as macroblock boundaries, and their sizes and locations are determined by the specific encoders and configurations. The sizes and locations of potential block boundaries may be identified before edge detection and edge strength measurements are applied. The block boundary size and location information may be determined from the encoding standards or the types of encoding tools that have been applied to the image or video content. Such information may also be obtained during the decoding process of the image or video feed, where the decoded information includes syntax information that indicates the partitions of blocks and the block locations and sizes.

At operation 206, pairing is performed with respect to the opposite sides of the boundaries of a macroblock. The pairing of edges could be either the vertical sides (e.g., left and right) or the horizontal sides (e.g., top and bottom) sides of a macroblock boundaries. This pairing may be performed to the macroblock boundaries determined to have edges or not to have edges at operation 204. In the case of two adjacent blocks, for example, a block on the left next to a block on the right, the middle edge between them may be paired with both the left edge of the left block and the right edge of the right block, resulting in two pairs of edges.

If there are edges at both sides of the macroblock boundaries, then such edges are marked as macroblocking edges at operation 208. Significant edge pairs at opposite sides of macroblock boundaries may be used to detect macroblocking effect. This is because macroblocking, especially macroblocking caused by transmission or encoding/decoding errors, often causes loss of information of the whole macroblock, and thus creates discontinuities simultaneously between inside and outside of the boundaries at both sides of the macroblocks. In some cases, a macroblock may have both of its vertical sides (left and right) and horizontal sides (top and bottom) detected as pairs of macroblocking edges.

At operation 210, the macroblocking edges in a video frame are aggregated to a measure of per-frame macroblocking assessment 212. The per-frame macroblocking assessment 212 is then aggregated across frames at operation 214 to create a macroblocking assessment 216 at different time-scales. Depending on the time scale, the macroblocking assessment may be for per group-of-picture (GoP), per-scene, per video asset, per-second, per-minute, per-hour, and any other time scales. Further aspects of the aggregation are described with respect to FIG. 5.

Figure 3:
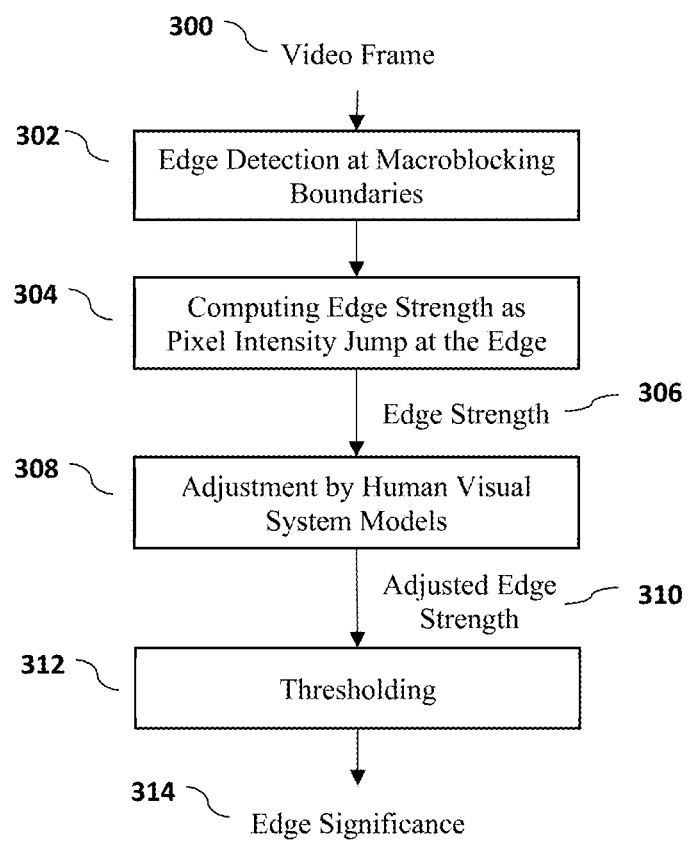
FIG. 3 illustrates an example process for computing and adjusting edge strength at macroblocking boundaries, as well as the determination of edge significance.

FIG. 3 illustrates an example process for computing and adjusting edge strength at macroblocking boundaries, as well as the determination of edge significance. In an example, these determinations may be performed on the video frames or still images being processed for the detection of macroblocking artifacts.

At operation 302, given a decoded video frame 300, edge detection is applied to all macroblock boundaries. Edge detection is a process by which object boundaries in images identified through relatively abrupt changes in image intensity. Edge detection techniques may involve techniques such as gradient-based approaches, template-based approaches, or morphology-based approaches. Various edge detection approaches may be used, such as the Sobel, Prewitt, and Roberts operators, the Canny edge detector, and many other edge detectors.

At operation 304, for the detected edges an edge strength is measured. This may be computed as a pixel intensity jump at the edge as detected. Such an edge strength is meaningful, but is purely numerical for edge intensity measure, without considering the visibility of such edges by the human visual system.

At operation 308, a human visual system-based model may be used to adjust the edge strength 310. Example aspects of use of the human visual system-based model are discussed in detail with respect to FIG. 4.

At operation 312 a binary decision is performed on the edge significance of each edge to determine edges from non-edges. In an example, this may be accomplished by thresholding the edge strength or human visual system model adjusted edge strength.

Figure 4:
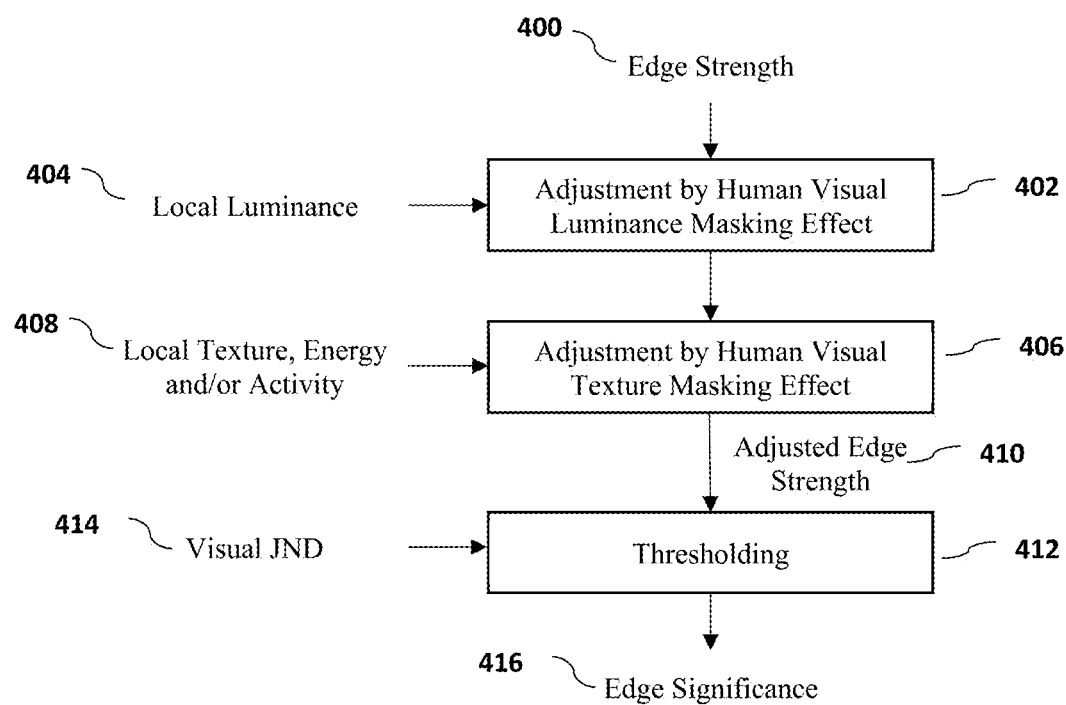
FIG. 4 illustrates an example process for using human visual system models in adjusting edge strength and determining edge significance.

FIG. 4 illustrates an example process for using human visual system (HVS) models in adjusting edge strength and determining resulting edge significance 416. This may allow for improvement in the detection of macroblocking, as the detected edges are counted as being those that would be perceived as being significant by the user, as opposed to those meeting a threshold independent of user perception.

At operation 402, given a numerical edge strength 400 measurement at an edge, the edge strength 400 may be adjusted in accordance with the human visual luminance masking effect. This involves using the local luminance 404 as a reference and adjusting the edge strength accordingly. One example of adjustment is by scaling the edge strength by a scale factor, which may be determined by the Webber's law or other measurement of the HVS.

At operation 406, the edge strength may be adjusted by the human visual texture masking effect. The texture masking effect of the HVS suggests that the visibility of a visual stimulus varies with respect to its surrounding signals that has similar spatial frequency and orientation with the visual stimulus. In practical image processing applications, the effect is often simplified to reduced signal visibility by the local signal energy or activity. The local signal energy or activity may be measured in many different ways. In an example, it may be computed as the variance or standard deviation of the pixels in the local region (of square, circular, or other shapes). In another example, it may be computed as the sum of absolute or squared coefficient values after high-pass filtering. In yet another example, it may be computed in Fourier transform or discrete cosine transform (DCT) domain as the sum of energy of all but the direct current (DC) coefficient. As a further example, it may also be computed in a wavelet or other multiresolution signal transform domain as the sum of energy of transform coefficients in the local regions. Thus, the texture masking effect adjustment takes the local texture, energy and/or activity measure 408 as input, and makes adjustment to the edge strength. One example of adjustment is by scaling the edge strength by a scale factor, which is determined by local energy or activity. In particular, for larger local energy/activity, the edge strength is scaled down, and vice versa. The resulting adjusted edge strength 410 is a scalar value that better reflects the visibility of the detected edges.

At operation 412, a binary decision is made on whether the edge is significant or not by a thresholding operator. This threshold may be determined, in an example, by a human visual just noticeable difference (JND) measure 414. A JND is an HVS feature that defines the minimum noticeable signal difference level that the HVS can perceive. The actual edge significance threshold may equal one JND, or be JND multiplying with a scale factor.

Thus, by involving these adjustments, the resulting edge significance 416 may be computed not only by the numerical edge signal strength, but also by several HVS features (luminance masking, texture masking, and JND-based thresholding).

Figure 5:
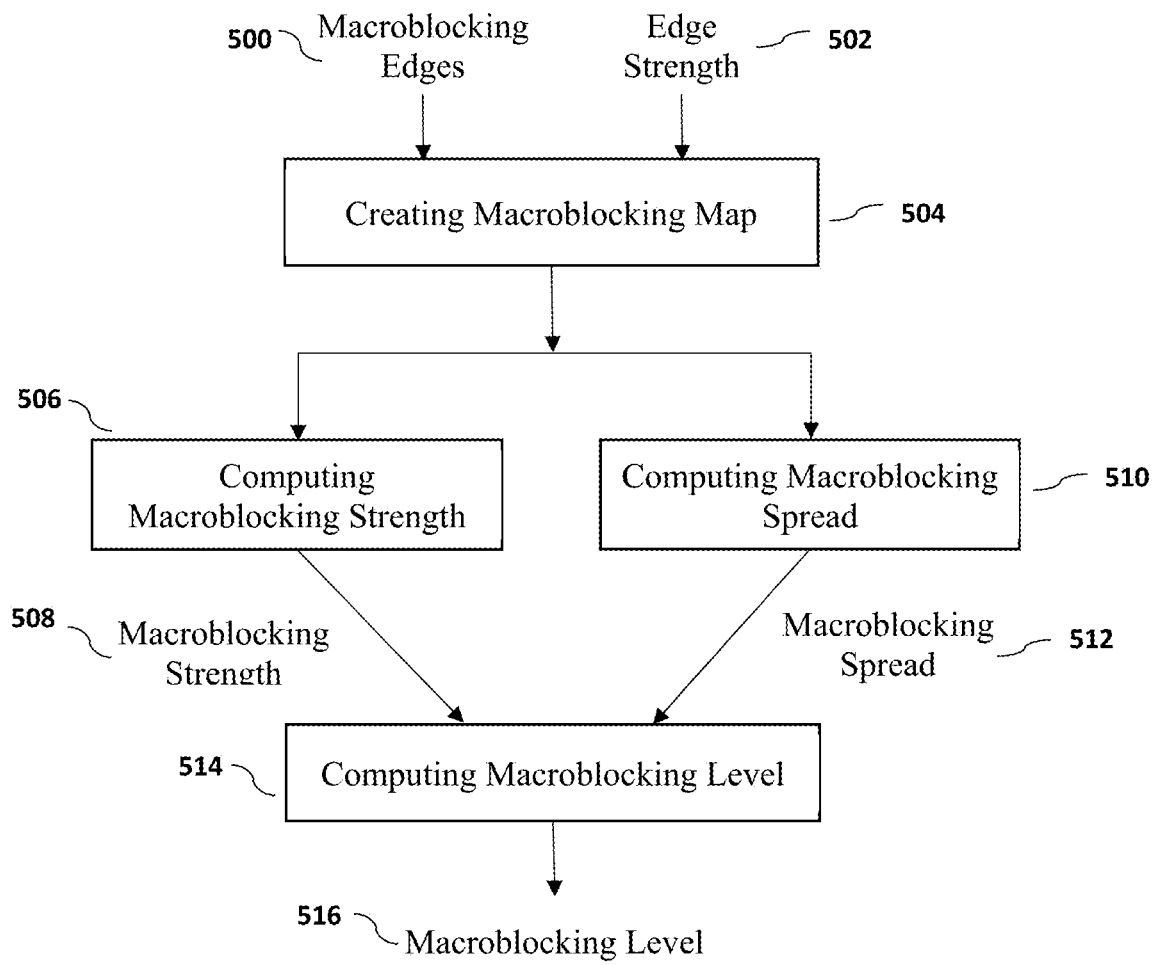
FIG. 5 illustrates an example process for creating macroblocking strength, macroblocking spread, and overall macroblocking level measures.

FIG. 5 illustrates an example process for creating macroblocking strength, macroblocking spread, and overall macroblocking level measures. To do so, a macroblocking map is created for each frame of video, and the frame-level overall macroblocking level assessment is computed by pooling the macroblocking map. The macroblocking map may be created from two types of information: the detected macroblocking edges 500, and the edge strength (or HVS adjusted edge strength) 502 of those edges.

At operation 504, the macroblocking map is created. This may include: 1) marking the pixel positions of detected macroblocking edges; and 2) determining the intensity level of each position in the macroblocking map as the measure of edge strength. FIG. 1 gives an example of such a macroblocking map 104, as mentioned above.

At operation 506, the macroblocking map of a video frame may be aggregated to a frame-level macroblocking strength measure 508. This aggregation may involve computing the average, weighted-average, median, percentile, maximum, or minimum of the map.

At operation 510, the macroblocking map of a video frame may also be aggregated to a frame-level macroblocking spread measure 512. This aggregation may involve computing the percentage of the area in the frame that contains macroblocking edges over the area of the whole frame.

At operation 514, a frame-level overall macroblocking level measure 516 is obtained by combining the macroblocking strength measure and the macroblocking spread measure. The combination may be performed by various techniques, such as by computing the sum, average, product, weighted-average, median, maximum, or minimum of the macroblocking strength measure and the macroblocking spread measure. In an example, this may create an instant score for the frame.

By using the macroblocking map, macroblocking artifacts caused by errors occurred in transmission (e.g., bit errors or packet loss) or in the video encoding/decoding processes may be detected and assessed. Moreover, the described techniques may also be used in a broad range of applications, such as lossy video compression where similar visual macroblocking artifacts are observed.

Figure 6:
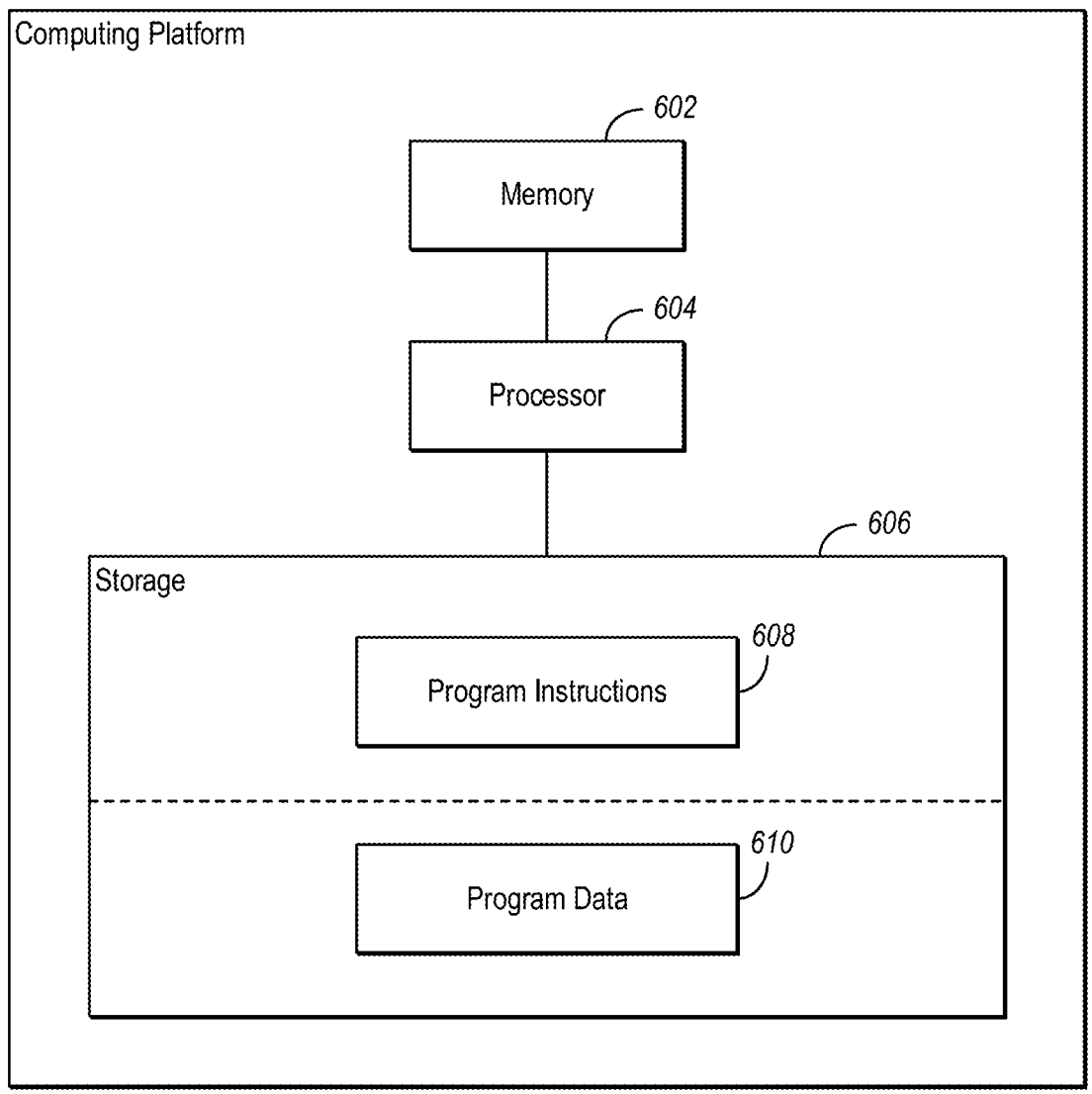
FIG. 6 illustrates an example computing device for performing automated detection of macroblocking artifacts in digital images and video signals.

FIG. 6 illustrates an example computing device 600 for performing automated detection of macroblocking artifacts in digital images and video signals. The algorithms and/or methodologies of one or more embodiments discussed herein, such as those illustrated with respect to FIGS. 2-5, may be implemented using such a computing device 600. The computing device 600 may include memory 602, processor 604, and non-volatile storage 606. The processor 604 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 602. The memory 602 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 606 may include one or more persistent data storage devices such as a hard drive, optical drive, tape drive, non-volatile solid-state device, cloud storage or any other device capable of persistently storing information.

The processor 604 may be configured to read into memory 602 and execute computer-executable instructions residing in program instructions 608 of the non-volatile storage 606 and embodying algorithms and/or methodologies of one or more embodiments. The program instructions 608 may include operating systems and applications. The program instructions 608 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 604, the computer-executable instructions of the program instructions 608 may cause the computing device 600 to implement one or more of the algorithms and/or methodologies disclosed herein. The non-volatile storage 606 may also include data 610 supporting the functions, features, and processes of the one or more embodiments described herein. This data 610 may include, as some examples, the images or video frames, detected edges, edge strengths, macroblock edge pairs, significance thresholds, macroblocking levels, pixel intensities, frame-level macroblocking strength measures, frame-level macroblocking spread measures, or multi-frame time scale measures.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assessing macroblocking artifacts in an encoded video, comprising:
   detecting macroblock boundaries and comparing strengths of the detected macroblock boundaries in each decoded frame of the video;
   pairing the detected macroblock boundaries at both horizontal or both vertical sides of each macroblock to identify parallel macroblock boundary pairs; and
   identifying a macroblocking level of the frame according to the parallel macroblock boundary pairs.

2. The method of claim 1, further comprising:
   for each pair of the parallel macroblock boundary pairs, identifying the macroblock boundaries of the pair as being macroblock boundaries if the strengths of both sides of the pair exceed a significance threshold; and determining the macroblocking level of the frame by aggregating the strengths of the macroblocking boundaries in the frame.

3. The method of claim 1, further comprising determining macroblock sizes and boundary positions according to aspects of an encoding configuration used to generate the encoded video.

4. The method of claim 1, further comprising computing the strengths according to a jump in pixel intensity at the macroblock boundary.

5. The method of claim 4, further comprising scaling the strengths by a scale factor indicative of human visual luminance masking effect, where the scale factor is determined by the pixel intensity or luminance level at the macroblock boundary.

6. The method of claim 4, further comprising scaling the strengths by a scale factor indicative of human visual texture masking effect, where the scale factor is determined by a local signal energy or activity measure in proximity to the macroblock boundary.

7. The method of claim 1, further comprising determining whether the strengths are significant by comparing the strengths with a pre-defined visibility threshold.

8. The method of claim 7, further comprising defining the visibility threshold as a human visual just noticeable difference (JND) or as the JND multiplied by a scale factor.

9. The method of claim 1, further comprising creating a macroblocking map for each video frame by:
marking pixel positions of detected macroblocking edges; and
determining an intensity level of each position in the macroblocking map as a measure of the strength at that position.

10. The method of claim 9, further comprising aggregating the macroblocking map to a frame-level macroblocking strength measure, by computing one or more of average, weighted-average, median, percentile, maximum, or minimum of the intensity level of each position in the macroblocking map.

11. The method of claim 9, further comprising aggregating the macroblocking map to a frame-level macroblocking spread measure, by computing a percentage of area in the frame that contains macroblock boundaries compared to overall area of the frame.

12. The method of claim 9, further comprising creating a frame-level overall macroblocking level measure by:
aggregating the macroblocking map to a frame-level macroblocking strength measure, by computing one or more of average, weighted-average, median, percentile, maximum, or minimum of the intensity level of each position in the macroblocking map;
aggregating the macroblocking map to a frame-level macroblocking spread measure, by computing a percentage of area in the frame that contains macroblock boundaries compared to overall area of the frame; and
combining the frame-level macroblocking strength measure and the frame-level macroblocking spread measure using computations including one or more of sum, average, product, weighted-average, median, maximum, or minimum.

13. The method of claim 1, further comprising aggregating per-frame macroblocking levels to macroblocking levels at over a multi-frame time scale, the time scale including one or more of per group-of-picture, per-scene, per video asset, per-second, per-minute, per-hour, or per arbitrary time period.

14. A system for assessing macroblocking artifacts in an encoded video, comprising:
a computing device programmed to:
detect macroblock boundaries and compute strengths at the macroblock boundaries in each decoded frame of the video;
pair the detected macroblock boundaries at both horizontal or both vertical sides of each macroblock to identify parallel macroblock boundary pairs; and
identify a macroblocking level of the frame according to the parallel macroblock boundary pairs.

15. The system of claim 14, wherein the computing device is further programmed to:
for each of the parallel macroblock boundary pairs, identify the macroblock boundaries of the pair as being macroblocking boundaries if the strengths of both sides of the pair exceed a significance threshold; and
determine a macroblocking level of the frame by aggregating the macroblocking boundaries in the frame.

16. The system of claim 14, wherein the computing device is further programmed to determine macroblock sizes and boundary positions according to aspects of an encoding configuration used to generate the encoded video.

17. The system of claim 14, wherein the computing device is further programmed to compute the strengths according to a jump in pixel intensity at the macroblock boundary.

18. The system of claim 17, wherein the computing device is further programmed to scale the strengths by a scale factor indicative of human visual luminance masking effect, where the scale factor is determined by the pixel intensity or luminance level at the macroblock boundary.

19. The system of claim 17, wherein the computing device is further programmed to scale the strengths by a scale factor indicative of human visual texture masking effect, where the scale factor is determined by a local signal energy or activity measure in proximity to the macroblock boundary.

20. The system of claim 14, wherein the computing device is further programmed to determine whether the strengths are significant by comparing the strengths with a pre-defined visibility threshold.

21. The system of claim 20, wherein the computing device is further programmed to define the visibility threshold as a human visual just noticeable difference (JND) or as the JND multiplied by a scale factor.

22. The system of claim 14, wherein the computing device is further programmed to create a macroblocking map for each video frame by operations including to:
mark pixel positions of detected macroblocking edges; and
determine an intensity level of each position in the macroblocking map as a measure of edge strength at that position.

23. The system of claim 22, wherein the computing device is further programmed to aggregate the macroblocking map to a frame-level macroblocking strength measure, by computing one or more of average, weighted-average, median, percentile, maximum, or minimum of the intensity level of each position in the macroblocking map.

24. The system of claim 22, wherein the computing device is further programmed to aggregate the macroblocking map to a frame-level macroblocking spread measure, by computing a percentage of area in the frame that contains macroblock boundaries compared to overall area of the frame.

25. The system of claim 22, wherein the computing device is further programmed to create a frame-level overall macroblocking level measure by operations including to:

aggregate the macroblocking map to a frame-level macroblocking strength measure, by computing one or more of average, weighted-average, median, percentile, maximum, or minimum of the intensity level of each position in the macroblocking map;

aggregate the macroblocking map to a frame-level macroblocking spread measure, by computing a percentage of area in the frame that contains macroblock boundaries compared to overall area of the frame; and combine the frame-level macroblocking strength measure and the frame-level macroblocking spread measure using computations including one or more of sum, average, product, weighted-average, median, maximum, or minimum.

26. The system of claim 14, wherein the computing device is further programmed to aggregate per-frame macroblocking levels to macroblocking levels at over a multi-frame time scale, the time scale including one or more of per group-of-picture, per-scene, per video asset, per-second, per-minute, per-hour, or per arbitrary time period.

27. The method of claim 1, wherein the macroblock boundaries are located at rectangular boundaries according to a block unit size of the encoding applied to the video.

* * * * *